US012292020B2

(12) United States Patent
Okamoto

(10) Patent No.: US 12,292,020 B2

(45) Date of Patent: May 6, 2025

(54) SUPPLY SYSTEM

(71) Applicant: ISUZU MOTORS LIMITED, Yokohama (JP)

(72) Inventor: Takeshi Okamoto, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 0 days.

(21) Appl. No.: 18/596,712

(22) Filed: Mar. 6, 2024

(65) Prior Publication Data

US 2024/0309832 A1 Sep. 19, 2024

(30) Foreign Application Priority Data

Mar. 16, 2023 (JP) ................................ 2023-042030

(51) Int. Cl.

*F02M 25/12* (2006.01)
*F02D 19/06* (2006.01)
*F02D 35/00* (2006.01)
*F02M 23/00* (2006.01)

(52) U.S. Cl.

CPC ......... *F02M 25/12* (2013.01); *F02D 19/0671* (2013.01); *F02D 35/0046* (2013.01); *F02M 23/006* (2013.01); *F02M 2700/123* (2013.01)

(58) Field of Classification Search

CPC ...... F02M 25/10; F02M 25/12; F02M 23/006; F02M 2700/123; F02D 19/0671; F02D 35/0046; F02D 41/0025; F02D 41/0027; B01D 2251/104; F02B 43/10

See application file for complete search history.

(56) References Cited

U.S. PATENT DOCUMENTS

| | | | | |
|---|---|---|---|---|
| 6,253,544 | B1 * | 7/2001 | Miller | F02M 25/12 60/275 |
| 6,314,732 | B1 * | 11/2001 | Lookholder | F02G 1/00 123/536 |
| 2005/0224042 | A1 * | 10/2005 | Shinagawa | F02D 19/0644 123/3 |
| 2018/0179995 | A1 * | 6/2018 | Ito | F02D 41/3035 |

FOREIGN PATENT DOCUMENTS

| | | | |
|---|---|---|---|
| JP | S61-295206 | A | 12/1986 |
| JP | H03-052342 | U | 5/1991 |
| JP | 2005-048631 | A | 2/2005 |
| JP | 2008-045459 | A | 2/2008 |
| JP | 2008-232011 | A | 10/2008 |
| JP | 2009-203950 | A | 9/2009 |
| JP | 2012-145005 | A | 8/2012 |
| JP | 2019-035368 | A | 3/2019 |
| JP | 2019052607 | A | 4/2019 |
| JP | 2019-074020 | A | 5/2019 |
| JP | 2019-143513 | A | 8/2019 |

* cited by examiner

*Primary Examiner* — Loren C Edwards

(74) *Attorney, Agent, or Firm* — Shih IP Law Group, PLLC

(57) ABSTRACT

A supply system for supplying ozone to an engine includes an electrolysis part that electrolyzes water to generate hydrogen and oxygen, a first supply part that supplies hydrogen generated by the electrolysis part to an intake pipe of the engine, an ozone generation part that generates ozone from oxygen generated by the electrolysis part, and a second supply part that supplies ozone generated by the ozone generation part to the intake pipe.

7 Claims, 3 Drawing Sheets

SUPPLY SYSTEM

CROSS-REFERENCE TO RELATED APPLICATIONS

The present application claims priority to Japanese Patent Applications number 2023-42030, filed on Mar. 16, 2023, contents of which are incorporated herein by reference in their entirety.

BACKGROUND OF THE INVENTION

The present disclosure relates to a supply system for supplying ozone to an engine. A technology for supplying ozone to an engine is known. Japanese Unexamined Patent Application Publication No. 2019-52607 discloses a technology for generating ozone from intake air (air) by generating an electrical discharge in an intake pipe of an engine and supplying said ozone to the engine.

However, when ozone is generated from air, nitrogen oxides are generated from nitrogen contained in the air. Nitrogen oxides remain after a combustion process of an engine, which can increase the amount of nitrogen oxides emitted from the engine after combustion.

BRIEF SUMMARY OF THE INVENTION

The present disclosure focuses on this point, and an object thereof is to suppress an increase in nitrogen oxides emitted from an engine.

Means for Solving the Problems

An aspect of the present disclosure provides a supply system for supplying ozone to an engine that includes an electrolysis part 1 that electrolyzes water to generate hydrogen and oxygen, a first supply part that supplies hydrogen generated by the electrolysis part to an intake pipe of the engine, an ozone generation part that generates ozone from oxygen generated by the electrolysis part, and a second supply part that supplies ozone generated by the ozone generation part to the intake pipe.

DETAILED DESCRIPTION OF THE INVENTION

Hereinafter, the present disclosure will be described through exemplary embodiments of the present disclosure, but the following exemplary embodiments do not limit the disclosure according to the claims, and not all of the combinations of features described in the exemplary embodiments are necessarily essential to the solution means of the disclosure.

[Configuration of Supply System S]

Figure 1:
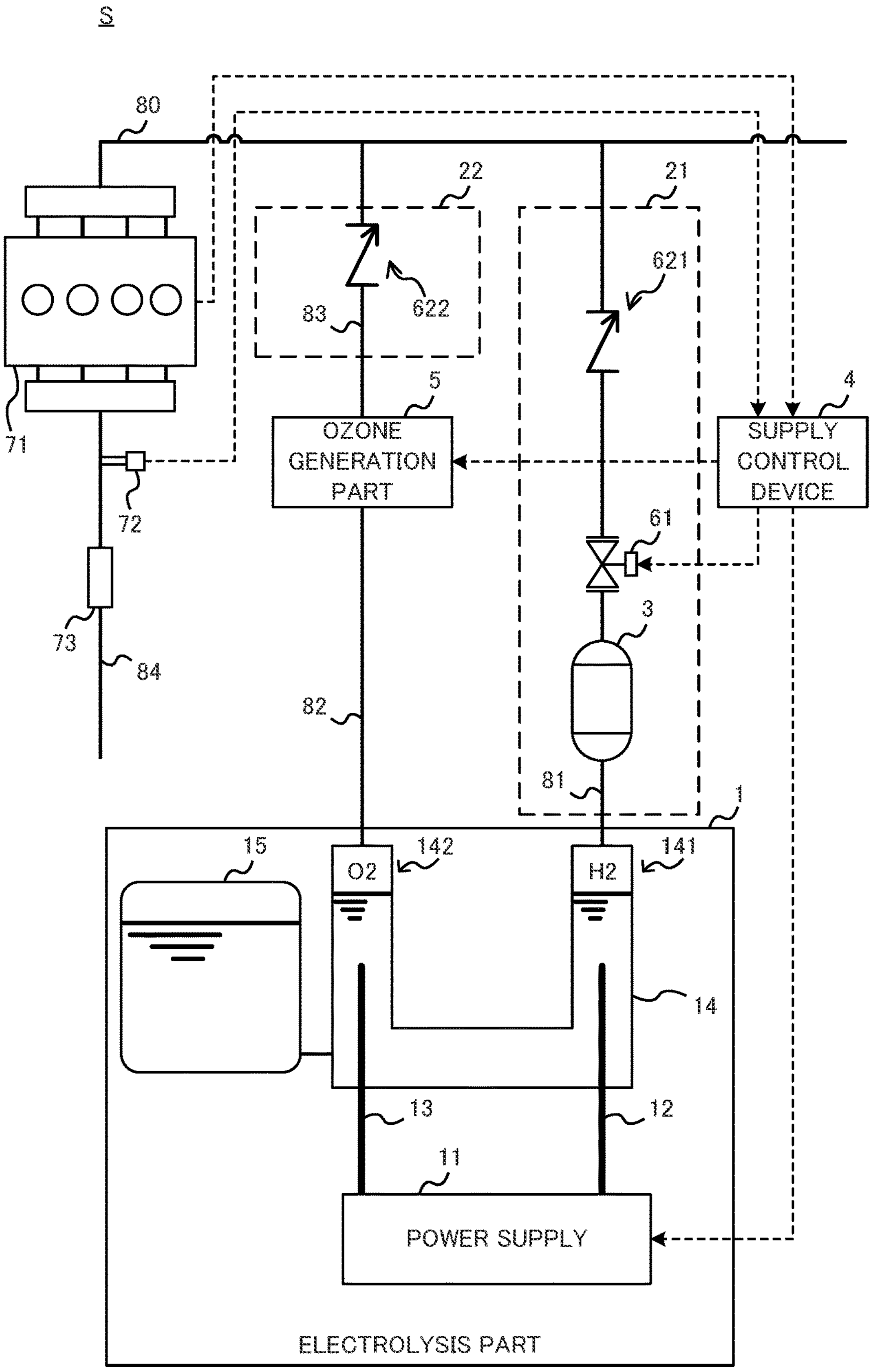
FIG. 1 illustrates a configuration of a supply system.

FIG. 1 illustrates a configuration of a supply system S. The supply system S includes an electrolysis part 1, a first supply part 21, a second supply part 22, a supply control device 4, an engine 71, a temperature sensor 72, a purification device 73, an intake pipe 80, and an exhaust pipe 84. The supply system S supplies ozone to the engine 71. The supply system S is provided in, for example, a vehicle, a ship, a power plant, or the like.

The electrolysis part 1 includes a power supply 11, a U-shaped pipe 14, and a water tank 15. Each of a cathode 12 and an anode 13 of the power supply 11 is inserted into the U-shaped pipe 14. The U-shaped pipe 14 is supplied with water from the water tank 15. The water tank 15 stores water to which an electrolyte has been added. The electrolyte is sodium hydroxide, sodium carbonate, sodium sulfate or sodium bicarbonate, for example, but is not limited to thereto. The water before the electrolyte is added is industrial pure water, for example, but may be tap water or cooling water of the engine 71.

The power supply 11 applies a voltage between the cathode 12 and the anode 13. The electrolysis part 1 generates hydrogen and oxygen by electrolyzing water by controlling the power supply 11 to apply a voltage between the cathode 12 and the anode 13. Specifically, when the power supply 11 applies a voltage between the cathode 12 and the anode 13, hydrogen is generated from the cathode 12 of the electrolysis part 1, and oxygen is generated from the anode 13 of the electrolysis part 1. The electric power of the power supply 11 is supplied from a battery, for example. Further, the electric power of the power supply 11 may be supplied from a photovoltaic power generation system or a regenerative energy system installed in the vehicle, when the supply system S is installed in a vehicle.

The hydrogen generated in the electrolysis part 1 is supplied from the first supply part 21 to the intake pipe 80. The first supply part 21 includes a first pipe line 81, a hydrogen tank 3, a control valve 61, and a check valve 621. The first pipe line 81 connects a cathode portion 141 of the U-shaped pipe 14 and the intake pipe 80. The hydrogen tank 3 is provided between the electrolysis part 1 and the control valve 61. The hydrogen generated by the cathode 12 of the electrolysis part 1 is stored in the hydrogen tank 3. The control valve 61 is provided between the intake pipe 80 and the hydrogen tank 3, and opens and closes under the control of the supply control device 4.

The check valve 621 is provided between the control valve 61 and the intake pipe 80. The check valve 621 passes the gas from the hydrogen tank 3 toward the intake pipe 80, and blocks the gas travelling from the intake pipe 80 toward the hydrogen tank 3. Specifically, the check valve 621 passes the hydrogen from the hydrogen tank 3 to the intake pipe 80 and blocks the hydrogen travelling from the intake pipe 80 toward the hydrogen tank 3. The check valve 621 is a disk check valve, for example, but is not limited thereto, and may be a poppet check valve, a swing check valve, or another type of check valve.

A second pipe line 82 connects an anode portion 142 of the U-shaped pipe 14 and an ozone generation part 5. The oxygen generated in the electrolysis part 1 is supplied from the second pipe line 82 to the ozone generation part 5.

The ozone generation part 5 generates ozone from the oxygen generated by the electrolysis part 1. The ozone generation part 5 converts the oxygen into ozone by irradiating oxygen with ultraviolet light, for example. Specifically, the ozone generation part 5 includes an ultraviolet lamp, generates ultraviolet light by turning on the ultraviolet lamp, and converts the oxygen passing through the ozone generation part 5 into ozone. Further, the ozone generation part 5 includes discharge electrodes, generates ultraviolet light by discharging between the discharge electrodes, and converts the oxygen passing through the ozone generation part 5 into ozone. The discharge is corona discharge or spark discharge, for example, but is not limited thereto. The electric power used by the ozone generation part 5 to generate ozone is supplied by the battery, the photovoltaic power generation system, or the regenerative energy system, as in the electrolysis part 1.

The ozone generation part 5 is supplied with the oxygen generated by electrolysis of water, and therefore the oxygen gas supplied to the ozone generation part 5 through the second pipe line 82 has a nitrogen content smaller than that of air. The ozone generation part 5 generates ozone from the oxygen gas which has a nitrogen content smaller than that of air, thereby reducing the amount of nitrogen oxide generated compared to the case where ozone is generated from air.

The second supply part 22 supplies the ozone generated by the ozone generation part 5 to the intake pipe 80. The second supply part 22 includes a third pipe line 83 and a check valve 622. The third pipe line 83 connects the ozone generation part 5 and the intake pipe 80. The check valve 622 is provided between the ozone generation part 5 and the intake pipe 80. The check valve 621 passes the gas from the ozone generation part 5 to the intake pipe 80 and blocks the gas from the intake pipe 80 to the ozone generation part 5. Specifically, the check valve 622 passes the ozone from the ozone generation part 5 to the intake pipe 80 and blocks the ozone from the intake pipe 80 to the ozone generation part 5. The check valve 622 may be a check valve of the same type as the check valve 621 or a check valve of a different type.

The engine 71 is an internal combustion engine that burns and expands a mixture of fuel and intake air (air) to generate power. The fuel is, for example, gasoline, light oil, or natural gas. The engine 71 takes in the ozone and the hydrogen supplied to the intake pipe 80 when taking in the intake air (air) from the intake pipe 80. The taking in of the ozone into the cylinder promotes combustion activity, thereby improving the efficiency of fuel combustion. In addition, hydrogen increases combustibility of fuel or acts as fuel. Specifically, the engine 71 can increase the power output by taking in the intake air including the hydrogen, as compared with the case where no hydrogen is taken in, when injecting the same amount of fuel.

The engine 71 dispels exhaust through the exhaust pipe 84. The amount of nitrogen oxide in the exhaust gas flowing through the exhaust pipe 84 is lower in the case where the ozone generated from oxygen gas is supplied to the intake pipe 80 than in the case where the ozone generated from air is supplied to the intake pipe 80. The exhaust pipe 84 is provided with the temperature sensor 72 and the purification device 73.

The temperature sensor 72 detects an exhaust gas temperature. The temperature sensor 72 is a thermocouple or thermistor, for example, but is not limited thereto. The interval at which the temperature sensor 72 detects the exhaust gas temperature may be appropriately set, and a specific value of this interval is 100 milliseconds, for example.

The purification device 73 purifies the exhaust gas from the engine 71. The purification device 73 is, for example, a Selective Catalytic Reduction (so-called Urea SCR). The SCR includes a catalyst that promotes reaction of nitrogen oxides and ammonia, and reduces nitrogen oxides to nitrogen and water by injecting urea water, a precursor of ammonia, into the exhaust gas flowing through the exhaust pipe 84 to cause the nitrogen oxides and ammonia to react on the catalyst. Further, the purification device 73 may include a catalyst that promotes reaction of nitrogen oxides and unburned fuel, and may cause the nitrogen oxides and the unburned fuel to react on the catalyst to achieve decomposition.

Figure 2:
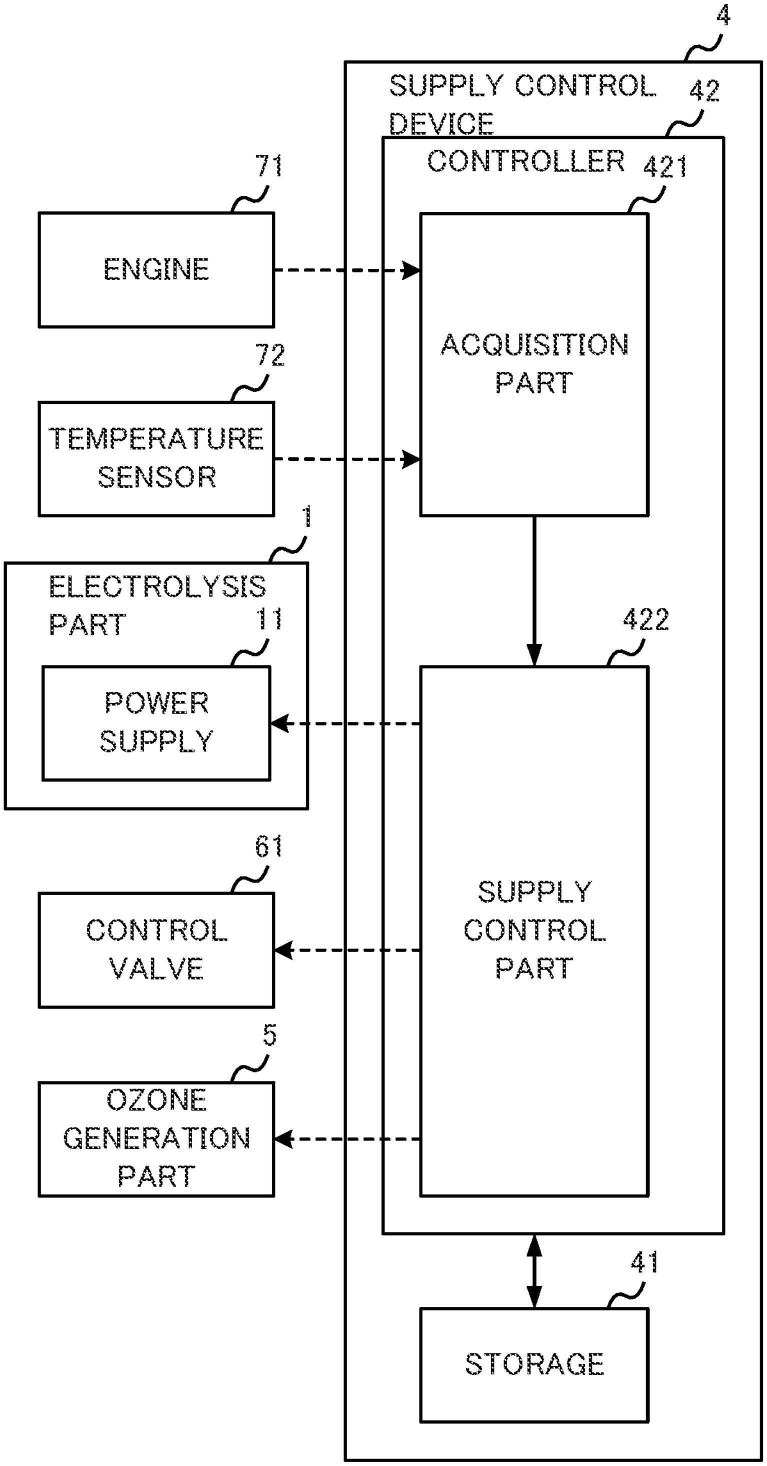
FIG. 2 illustrates a configuration of a supply control device.

The supply control device 4 controls supply of the hydrogen and the ozone to the intake pipe 80. FIG. 2 illustrates a configuration of the supply control device 4. The supply control device 4 includes a storage 41 and a controller 42. The storage 41 is a storage medium including a Read Only Memory (ROM), a Random Access Memory (RAM), a hard disk, and the like. The storage 41 stores a program executed by the controller 42.

The controller 42 is a calculation resource including a processor such as a Central Processing Unit (CPU). The controller 42 implements functions as an acquisition part 421 and a supply control part 422 by executing the program stored in the storage 41.

The acquisition part 421 acquires a requested torque of the engine 71 from the engine 71. Specifically, the acquisition part 421 acquires the requested torque indicating a magnitude of a torque requested by the engine 71 from a control device that controls the engine 71. Further, the acquisition part 421 acquires the exhaust gas temperature detected by the temperature sensor 72.

The supply control part 422 causes the electrolysis part 1 to generate hydrogen and oxygen. Specifically, the supply control part 422 causes the electrolysis part 1 to electrolyze water by causing the power supply 11 of the electrolysis part 1 to apply a voltage to the cathode 12 and the anode 13, thereby generating hydrogen and oxygen.

The supply control part 422 supplies the hydrogen, generated by the electrolysis part 1, from the first supply part 21 to the intake pipe 80. Specifically, the supply control part 422 opens the control valve 61 to supply the hydrogen stored in the hydrogen tank 3 to the intake pipe 80. More specifically, the supply control part 422 adjusts an opening degree of the control valve 61 to supply the hydrogen in an amount corresponding to the requested torque from the hydrogen tank 3 to the intake pipe 80. The supply control part 422 supplies the hydrogen in an amount proportional to the requested torque to the intake pipe 80. This allows the engine 71 to take the hydrogen into a combustion chamber of the engine 71, thereby reducing the amount of fuel injected into the cylinder when outputting the requested torque. As a result, the supply control part 422 can reduce nitrogen oxides generated in the combustion process and unburned fuel, thereby reducing the amount of nitrogen oxides supplied to the purification device 73. Therefore, the supply control part 422 can improve an exhaust gas purification rate of the purification device 73 as compared with the case where ozone is generated from air and supplied to the intake pipe 80.

The supply control part 422 supplies hydrogen to the intake pipe 80 when the exhaust gas temperature is lower than a predetermined value. The predetermined value is a reaction temperature at which at least any of i) nitrogen oxides and unburned fuel and ii) nitrogen oxides and ammonia start to react on the catalyst of the purification device 73. The reaction temperature is 200 to 300 degrees Celsius, for example, but is not limited thereto. The supply control part 422 supplies hydrogen to the intake pipe 80 when the exhaust gas temperature is lower than the reaction temperature of the catalyst, thereby reducing the amount of fuel injected into the cylinder. As a result, the supply control part 422 can reduce the amount of unburned fuel and nitrogen oxides supplied to the purification device 73, thereby improving the exhaust gas purification rate of the purification device 73.

When the exhaust gas temperature is equal to or higher than the predetermined value, the supply control part 422 does not supply hydrogen to the intake pipe. Specifically, the supply control part 422 closes the control valve 61 to stop the supply of hydrogen from the hydrogen tank 3 of the first supply part 21 to the intake pipe 80. Thus, hydrogen generated by the electrolysis part 1 is stored in the hydrogen tank 3. In this manner, when the exhaust gas temperature is higher than the reaction temperature, the supply control part 422 can store the generated hydrogen in the hydrogen tank 3.

The supply control part 422 supplies the ozone generated by the ozone generation part 5 to the intake pipe 80. For example, the supply control part 422 causes the ozone generation part 5 to radiate ultraviolet light. This converts the oxygen passing through the ozone generation part 5 into ozone, thereby generating ozone. The supply control part 422 supplies the generated ozone from the second supply part 22 to the intake pipe 80. As a result, the supply control part 422 can supply ozone having a lower nitrogen oxide content to the intake pipe 80 than in the case where ozone is generated from air, thereby suppressing an increase in nitrogen oxides emitted from the engine after combustion. Therefore, the supply control part 422 can suppress a decrease in the exhaust gas purification rate of the purification device 73 as compared with the case where ozone is generated from air.

The supply control part 422 supplies ozone to the intake pipe 80 when the exhaust gas temperature is lower than the predetermined value. The supply control part 422 can enhance the fuel combustion efficiency by supplying ozone to the intake pipe 80, thereby reducing the amount of nitrogen oxides generated in the engine 71. Accordingly, the supply control part 422 can suppress the nitrogen oxides emitted from the engine 71. Further, the supply control part 422 can improve the exhaust gas purification rate of the purification device 73.

When the exhaust gas temperature is equal to or higher than the predetermined value, the supply control part 422 does not supply ozone to the intake pipe 80. Specifically, the supply control part 422 stops the application of the voltage to the cathode 12 and the anode 13 by the power supply 11 of the electrolysis part 1, and stops an operation of the ozone generation part 5. Thus, when the exhaust gas temperature is higher than the reaction temperature, the supply control part 422 can suppress the electric power for electrolysis of water and generation of ozone, thereby reducing power consumption.

[Process of Supplying Hydrogen and Ozone]

Figure 3:
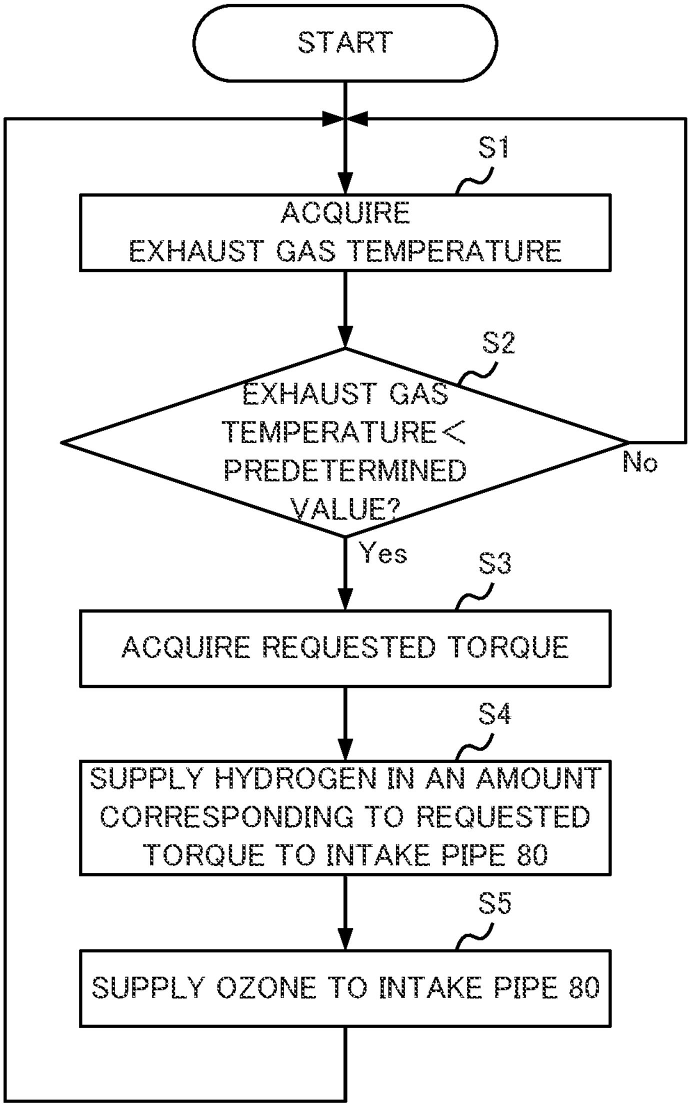
FIG. 3 is a flowchart showing an example of a process of supplying hydrogen and ozone, executed by the supply control device.

FIG. 3 is a flowchart showing an example of a process of supplying hydrogen and ozone, executed by the supply control device 4. The flowchart in FIG. 3 is repeatedly executed while the apparatus in which the supply system S is installed is operating.

The acquisition part 421 acquires the exhaust gas temperature (step S1). Specifically, the acquisition part 421 acquires the exhaust gas temperature detected by the temperature sensor 72.

The acquisition part 421 determines whether or not the exhaust gas temperature is lower than the predetermined value (step S2). When the exhaust gas temperature is equal to or higher than the predetermined value (No in step S2), the acquisition part 421 waits until the exhaust gas temperature becomes lower than the predetermined value. When the exhaust gas temperature is lower than the predetermined value (Yes in step S2), the acquisition part 421 acquires the requested torque (step S3).

When the requested torque has been acquired, the supply control part 422 supplies hydrogen in an amount corresponding to the requested torque from the first supply part 21 to the intake pipe 80 (step S4). Specifically, the supply control part 422 adjusts the opening degree of the control valve 61 to supply the hydrogen in an amount proportional to the requested torque from the hydrogen tank 3 of the first supply part 21 to the intake pipe 80.

The supply control part 422 supplies ozone from the second supply part 22 to the intake pipe 80 (step S5). Specifically, when the exhaust gas temperature is lower than the predetermined value, the supply control part 422 first causes the electrolysis part 1 to electrolyze water to generate oxygen and hydrogen. Subsequently, the supply control part 422 operates the ozone generation part 5 to irradiate the oxygen passing through the ozone generation part 5 with ultraviolet light to convert the oxygen into ozone. It should be noted that the process of step S5 may be executed before step S4 or may be executed in parallel with step S4.

[Effect of the Supply System S]

As described above, the supply system S first electrolyzes water to generate hydrogen and oxygen. Subsequently, the supply system S generates ozone from the oxygen generated by the electrolysis. Therefore, the supply system S can generate ozone from the oxygen gas having a nitrogen content lower than air, thereby suppressing the generation of nitrogen oxides. The supply system S then supplies the generated hydrogen and ozone to the intake pipe 80. As a result, the supply system S can suppress an increase in nitrogen oxides emitted from the engine 71 after combustion.

The supply system S can improve combustion efficiency of fuel by supplying ozone to the intake pipe 80. As a result, the supply system S can reduce unburned fuel and nitrogen oxides, thereby improving the exhaust gas purification rate of the purification device 73. Further, the supply system S can reduce the injection amount of fuel by supplying hydrogen to the intake pipe 80 instead of fuel. Therefore, the supply system S can reduce unburned fuel and nitrogen oxides, thereby improving the exhaust gas purification rate.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments of the present disclosure. Further, effects of the new exemplary embodiments brought by the combinations also have the effects of the original exemplary embodiments.

The invention claimed is:

1. A supply system for supplying ozone to an engine, comprising:

an electrolyzer that electrolyzes water to generate hydrogen and oxygen;

a first supplier that supplies the hydrogen generated by the electrolyzer to an intake pipe of the engine;

an ozone generator that generates ozone from the oxygen generated by the electrolyzer; and a second supplier that supplies the ozone generated by the ozone generator to the intake pipe; and a processor that executes a supply control program to supply the hydrogen to the intake pipe when an exhaust gas temperature of the engine is lower than a predetermined value, and does not supply the hydrogen to the intake pipe when the exhaust gas temperature of the engine is equal to or higher than the predetermined value, wherein the predetermined value is a reaction temperature at which at least any of i) nitrogen oxides and unburned fuel and ii) nitrogen oxides and ammonia start to react on a catalyst of a purification device provided in an exhaust pipe of the engine.

2. The supply system according to claim 1, wherein the processor further executes the supply control program to supply the ozone to the intake pipe when the exhaust gas temperature of the engine is lower than the predetermined value, and does not supply the ozone to the intake pipe when the exhaust gas temperature of the engine is equal to or higher than the predetermined value.

3. The supply system according to claim 1, wherein when the exhaust gas temperature is equal to or higher than the predetermined value, the processor further executes the supply control program to close a control valve provided in a pipe line connecting the electrolyzer and the intake pipe, and stores the hydrogen in a hydrogen tank provided between the electrolyzer and the control valve.

4. The supply system according to claim 1, wherein the processor further executes the a-supply control program to open a control valve provided in a pipe line connecting the electrolyzer and the intake pipe to supply the hydrogen stored in a hydrogen tank provided between the electrolyzer and the control valve to the intake pipe.

5. The supply system according to claim 4, wherein the processor further executes the supply control program to adjust an opening degree of the control valve to supply an amount of the hydrogen proportional to a requested torque of the engine from the hydrogen tank to the intake pipe.

6. The supply system according to claim 1, wherein the ozone generator converts the oxygen into the ozone by irradiating the oxygen passing through the ozone generator with ultraviolet light.

7. The supply system according to claim 6, wherein the ozone generator generates the ultraviolet light by turning on an ultraviolet lamp or discharging between electrodes in the ozone generator, and irradiates the oxygen passing through the ozone generator with the ultraviolet light.

* * * * *